US012732754B2

(12) United States Patent
Groleau

(10) Patent No.: US 12,732,754 B2
(45) Date of Patent: Sep. 8, 2026

(54) SPEAKER ASSEMBLY WITH MECHANICALLY-COUPLED MAGNET

(71) Applicant: Harman International Industries, Incorporated, Stamford, CT (US)

(72) Inventor: Patrick Groleau, Novi, MI (US)

(73) Assignee: Harman International Industries, Incorporated, Stamford, CT (US)

( * ) Notice: Subject to any disclaimer, the term of this patent is extended or adjusted under 35 U.S.C. 154(b) by 120 days.

(21) Appl. No.: 18/779,315

(22) Filed: Jul. 22, 2024

(65) Prior Publication Data

US 2024/0414481 A1 Dec. 12, 2024

Related U.S. Application Data

(62) Division of application No. 17/949,311, filed on Sep. 21, 2022, now Pat. No. 12,081,956.

(51) Int. Cl.
*H04R 9/02* (2006.01)

(52) U.S. Cl.
CPC .......... *H04R 9/025* (2013.01); *H04R 2400/11* (2013.01)

(58) Field of Classification Search
CPC ...................................................... H04R 9/025
See application file for complete search history.

(56) References Cited

U.S. PATENT DOCUMENTS

| | | | | |
|---|---|---|---|---|
| 4,158,756 | A * | 6/1979 | Keezer | H04R 31/006 381/189 |
| 4,331,841 | A | 5/1982 | Castagna | |
| 4,591,672 | A * | 5/1986 | Kato | H04R 9/06 381/354 |
| 5,150,419 | A | 9/1992 | Kizak et al. | |
| 7,266,213 | B2 | 9/2007 | Furuya | |
| 7,894,623 | B2 | 2/2011 | Mihelich et al. | |
| 8,315,421 | B2 | 11/2012 | Mihelich et al. | |
| 9,154,864 | B1 | 10/2015 | Sell | |
| 11,432,091 | B2 | 8/2022 | Lin et al. | |
| 2010/0329497 | A1* | 12/2010 | Perovic | H04R 9/022 381/349 |
| 2011/0274309 | A1 | 11/2011 | Doh et al. | |
| 2013/0070955 | A1 | 3/2013 | Holt et al. | |
| 2014/0294228 | A1* | 10/2014 | Itano | H04R 9/025 381/414 |

FOREIGN PATENT DOCUMENTS

| | | | |
|---|---|---|---|
| CN | 201435821 Y | | 3/2010 |
| CN | 209659590 U | * | 11/2019 |
| EP | 2768245 A1 | | 8/2014 |
| WO | 9858520 A1 | | 12/1998 |

OTHER PUBLICATIONS

English Language Translation of CN-209659590U, pp. 1-3. (Year: 2019).*
Extended European Search Report for Application No. 23194188.1, dated Jan. 25, 2024, 11 pages.

* cited by examiner

*Primary Examiner* — Paul W Huber
(74) *Attorney, Agent, or Firm* — Brooks Kushman P.C.

(57) ABSTRACT

A speaker assembly includes a basket including an opening having a rim and a flange extending downwardly from the rim, the flange including at least one rib extending circumferentially around an inner surface of the flange. A magnet includes at least one groove extending circumferentially around the magnet. The magnet is insert molded with the basket below the rim such that the at least one groove receives the at least one rib to mechanically couple the magnet to the basket.

9 Claims, 6 Drawing Sheets

SPEAKER ASSEMBLY WITH MECHANICALLY-COUPLED MAGNET

CROSS-REFERENCE TO RELATED APPLICATIONS

This application is a division of U.S. application Ser. No. 17/949,311 filed Sep. 21, 2022, now U.S. Pat. No. 12,081,956 the disclosure of which is hereby incorporated in its entirety by reference herein.

TECHNICAL FIELD

Embodiments relate to a speaker assembly including a magnet which is mechanically coupled to the basket.

BACKGROUND

Plastic speaker baskets may be used to reduce weight and provide a low cost structure for certain speaker applications. Current designs employ an adhesive to bond the magnet to the plastic basket and insert-molded front plate, where the adhesive joint is required to support substantial mass. Such implementations may not have the required durability for some applications or validation specifications, as the surface tension and sufficiency of the bonding may be inadequate depending on the quality of the components.

SUMMARY

In one or more embodiments, a speaker assembly includes a basket including an opening having a rim and a flange extending downwardly from the rim, the flange including at least one rib extending circumferentially around an inner surface of the flange. A magnet includes at least one groove extending circumferentially around the magnet. The magnet is insert molded with the basket below the rim such that the at least one groove receives the at least one rib to mechanically couple the magnet to the basket.

In one or more embodiments, a speaker assembly includes a basket including an opening having a rim and a plurality of tabs extending downwardly from the rim and spaced around the rim, each tab including at least one rib extending along an inner surface of the tab. A magnet includes at least one groove extending circumferentially around the magnet. The magnet is received within the basket below the rim such that the at least one groove receives the at least one rib to mechanically couple the magnet to the basket.

In one or more embodiments, a speaker assembly includes a basket including an opening having a rim, the rim including a plurality of posts extending downwardly therefrom and spaced around the rim. The speaker assembly further includes a magnet including a plurality of channels extending therethrough between a top surface and a bottom surface of the magnet. The magnet is insert molded with the basket below the rim such that the plurality of posts extend through the plurality of channels to mechanically couple the magnet to the basket.

In one or more embodiments, the magnet comprises ferrite and is injection molded to form the at least one groove or the plurality of channels. The speaker assembly may further include a front plate disposed within the basket adjacent to the rim. The flange may extend downwardly beyond the front plate. The flange may include two spaced ribs and the magnet may include two spaced grooves configured to receive the two spaced ribs. The at least one groove may be adjacent to a top surface of the magnet, or the at least one groove may be adjacent to a bottom surface of the magnet, or the at least one groove may be disposed in a middle portion of the magnet. In one or more embodiments, a top surface of the magnet may be configured to be adhesively secured to a bottom surface of the front plate. The speaker assembly may further include a pole piece adhesively secured to a bottom surface of the magnet. The basket may be constructed from a plastic material.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
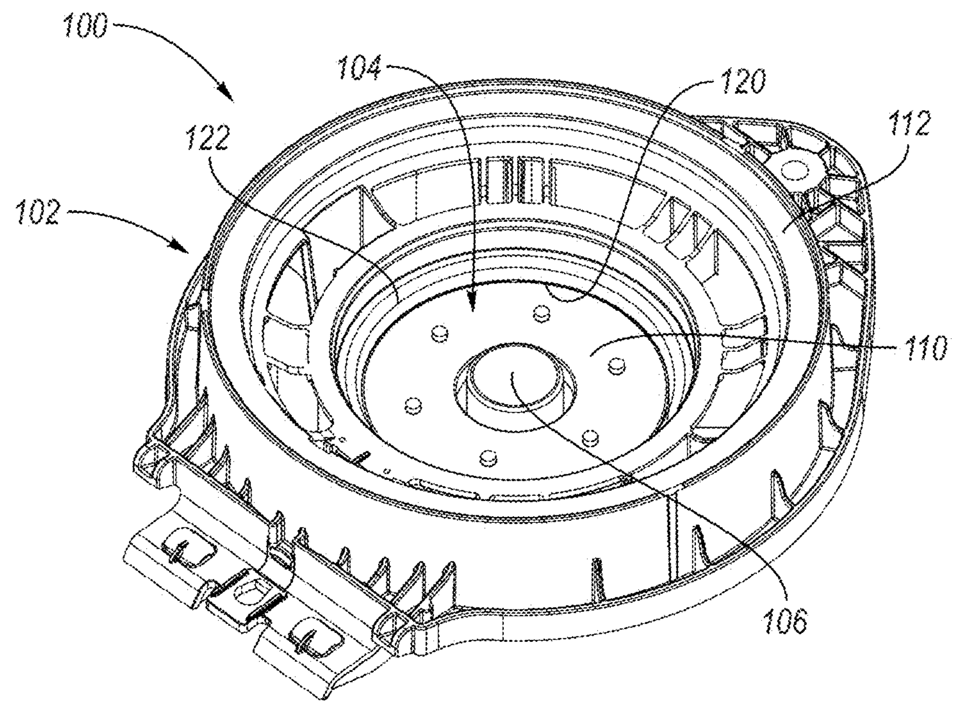
FIG. 1 is a top perspective view of a speaker assembly according to an embodiment.
Figure 2:
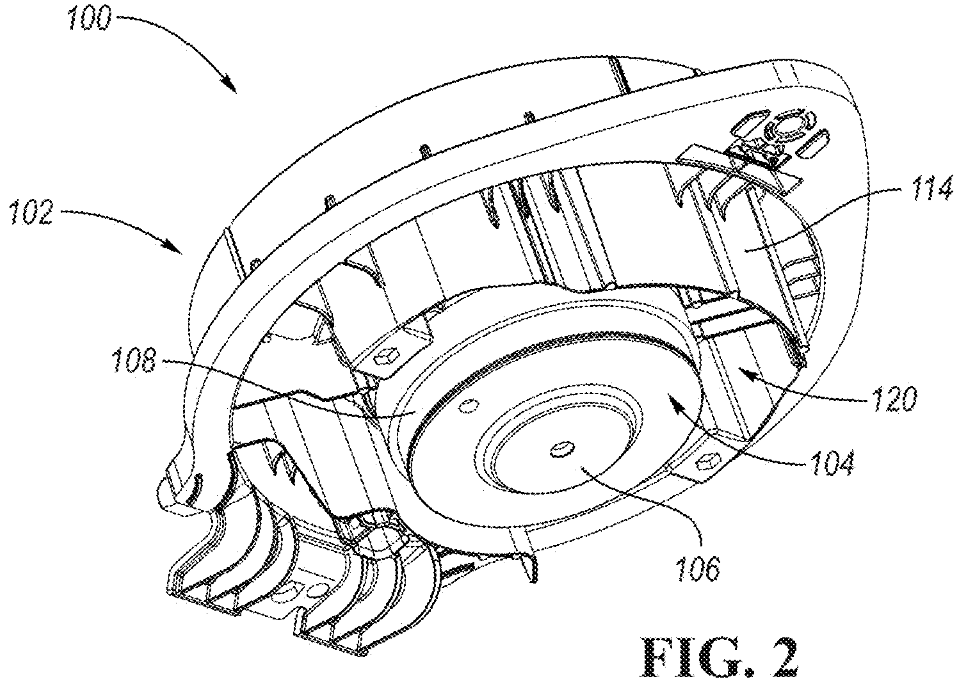
FIG. 2 is a bottom perspective view of a speaker assembly according to an embodiment.

As illustrated in FIGS. 1 and 2, a speaker assembly 100 according to an embodiment may include a basket 102 and a speaker motor 104 received in the basket 102. The basket 102 may be formed of a plastic material, for example, a polycarbonate material or any other thermoplastic resin-based material. As is known in the art, the speaker motor 104 may comprise an assembly including a back plate or pole piece 106, at least one permanent magnet 108, and a top or front plate 110. The magnet 108 may have an annular configuration, with the pole piece 106 configured to extend therethrough.

The speaker motor 104 may provide a substantially uniform magnetic field across an air gap, and a voice coil former may support a voice coil in the magnetic field (components not shown). The basket 102 includes an upper portion 112 configured to receive a cone or diaphragm (not shown) and a lower portion 114 configured to receive the speaker motor 104. During operation, axial reciprocation of the voice coil in the air gap in connection with the diaphragm generates sound representing the program material transduced by the speaker assembly 100. It is understood that other speaker components may alternatively or additionally be included in the speaker assembly 100.

In one or more embodiments, the speaker assembly 100 may utilize adhesive to create bonding joints to attach the magnet 108 to the basket 102. A top surface 116 of the magnet 108 may be configured to be adhesively secured to the front plate 110 to form a first adhesive joint 1. The pole piece 106 may be configured to be adhesively secured to a bottom surface 118 of the magnet 108 to form a second adhesive joint 2. More particularly, during the assembly process, the magnet 108 may be positioned on top of the pole piece 106 and secured with adhesive at the magnet bottom surface 118 to form the second adhesive joint 2. The front plate 110 may be positioned over the top surface 116 of the magnet 108 and secured with adhesive to form the first adhesive joint 1.

In contrast to previous speaker assemblies wherein the mass of the magnet 108 and pole piece 106 hang from the front plate solely supported by the first adhesive joint 1 between the magnet 108 and the front plate 110, the embodiments disclosed herein use the basket 102 to help support the mass of the speaker motor 104, redistributing the load of the magnet 108 and other motor components along the basket 102 as described further below.

With continuing reference to FIG. 1, the lower portion 114 of the basket 102 has an opening 120 therein for receiving the speaker motor 104, with a rim 122 surrounding the opening 120. In one or more embodiments, the magnet 108 may comprise ferrite such as, but not limited to, a ferrite composite or ferrite combined with other additives. According to embodiments disclosed herein, the magnet 108 may be injection molded to allow for features and geometry to be added to the magnet 108 which facilitate mechanically coupling of the magnet 108 to the plastic basket 102. In each embodiment, the top surface 116 and the bottom surface 118 of the magnet 108 remain suitable for bonding to other components of the speaker motor 104.

As shown in the embodiments of FIGS. 3-11, the magnet 108 may be injection molded to include at least one groove 124 extending circumferentially around the magnet 108, wherein the groove 124 is a section of the magnet 108 inset from an outer surface 126 of the magnet 108. The basket 102 may include a flange 128 extending downwardly from the rim 122, the flange 128 having a diameter greater than a diameter of the magnet 108 at the outer surface 126. The flange 128 may extend substantially or completely around a perimeter of the rim 122, providing lateral support for the magnet 108. The front plate 110 may be disposed within the basket 102 adjacent to the rim 122, wherein the flange 128 may extend downwardly beyond the front plate 110.

The flange 128 includes at least one rib 130 extending circumferentially around an inner surface 132 of the flange 128, where the rib 130 may be created during injection molding of the plastic basket 102. The magnet 108 is insert molded with the basket 102 below the rim 122 such that the groove 124 is configured to receive the rib 130 to mechanically couple the magnet 108 to the basket 102. In other words, insert molding the magnet 108 with the basket 102 causes the rib 130 to form on the flange 128 and fill the groove 124 in the magnet 108, thus securing the ferrite magnet 108 in place via the plastic rib 130.

Figure 3:
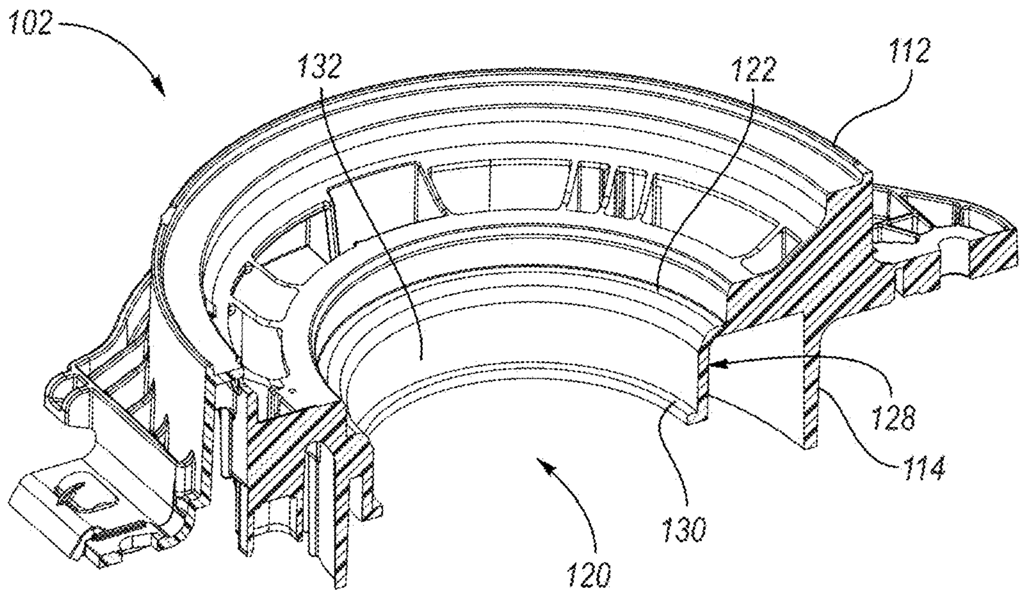
FIG. 3 is a cutaway perspective view of a basket according to a first embodiment.
Figure 4:
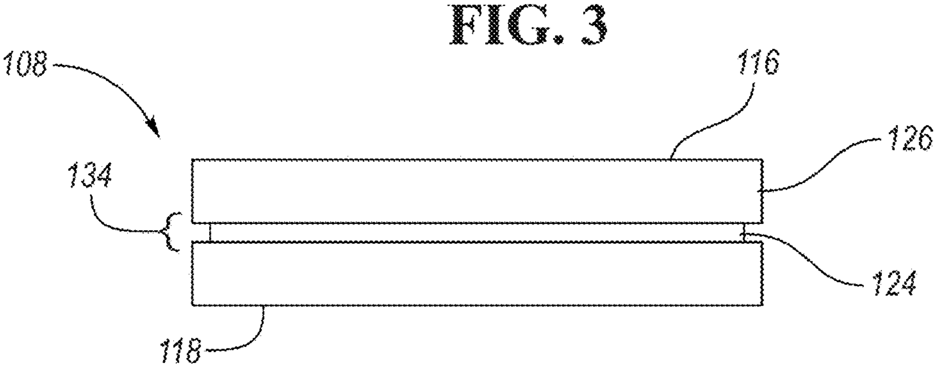
FIG. 4 is a side view of a magnet according to the first embodiment.
Figure 5:
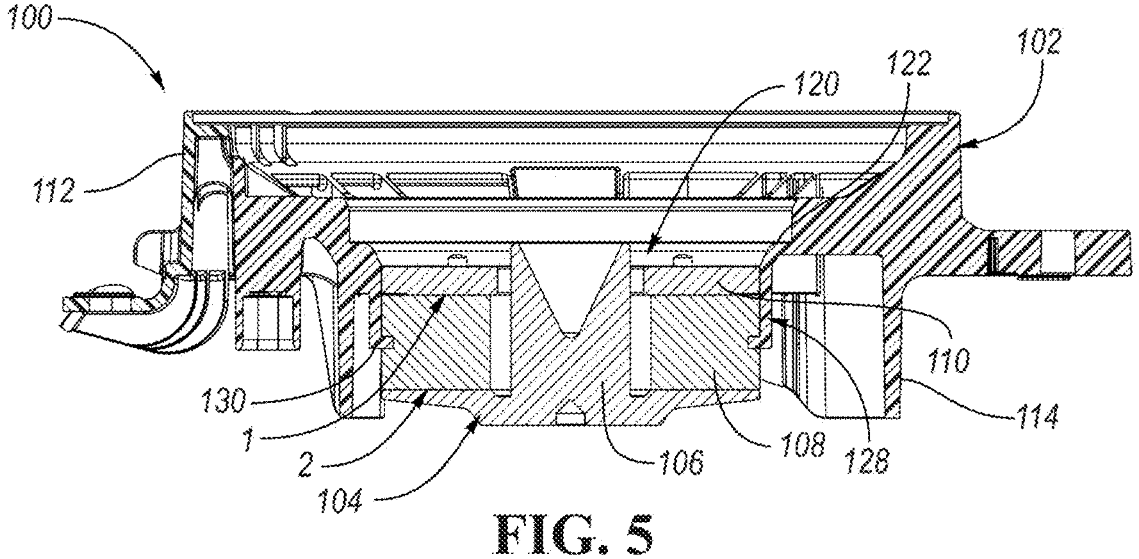
FIG. 5 is a cross-sectional view of the magnet of FIG. 4 assembled in the basket of FIG. 3.
Figure 6:
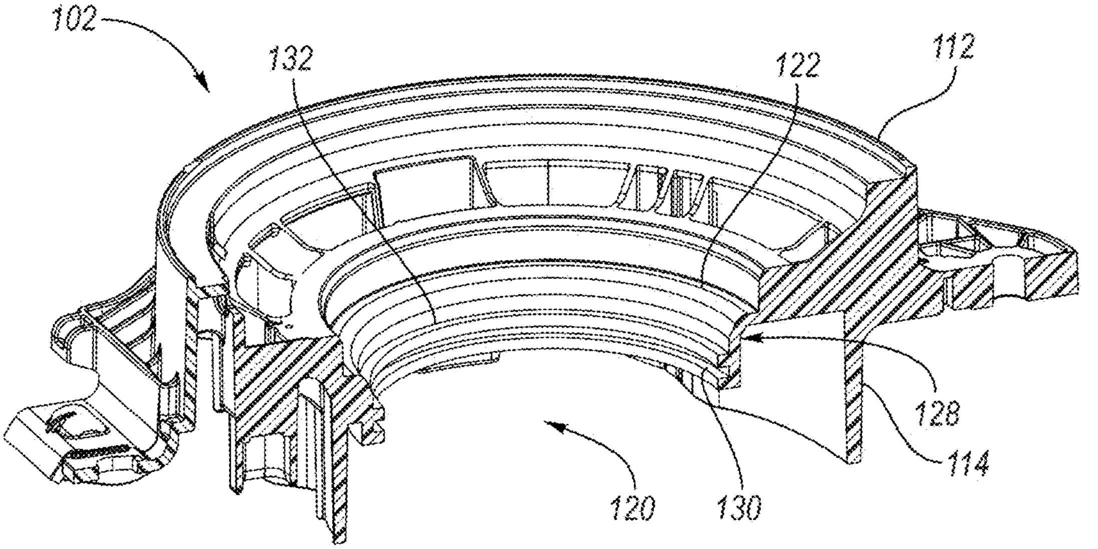
FIG. 6 is a cutaway perspective view of a basket according to a second embodiment.
Figure 7:
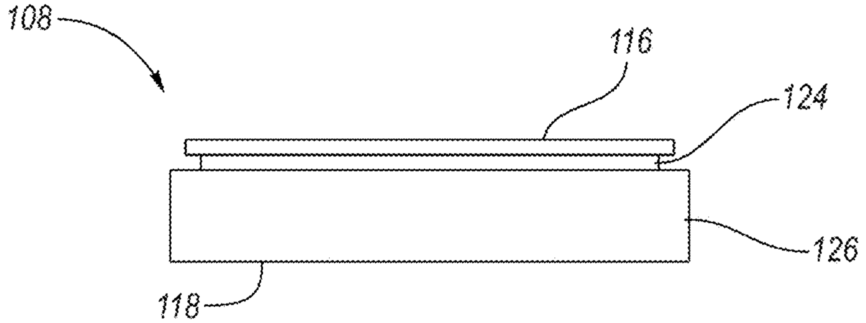
FIG. 7 is a side view of a magnet according to the second embodiment.
Figure 8:
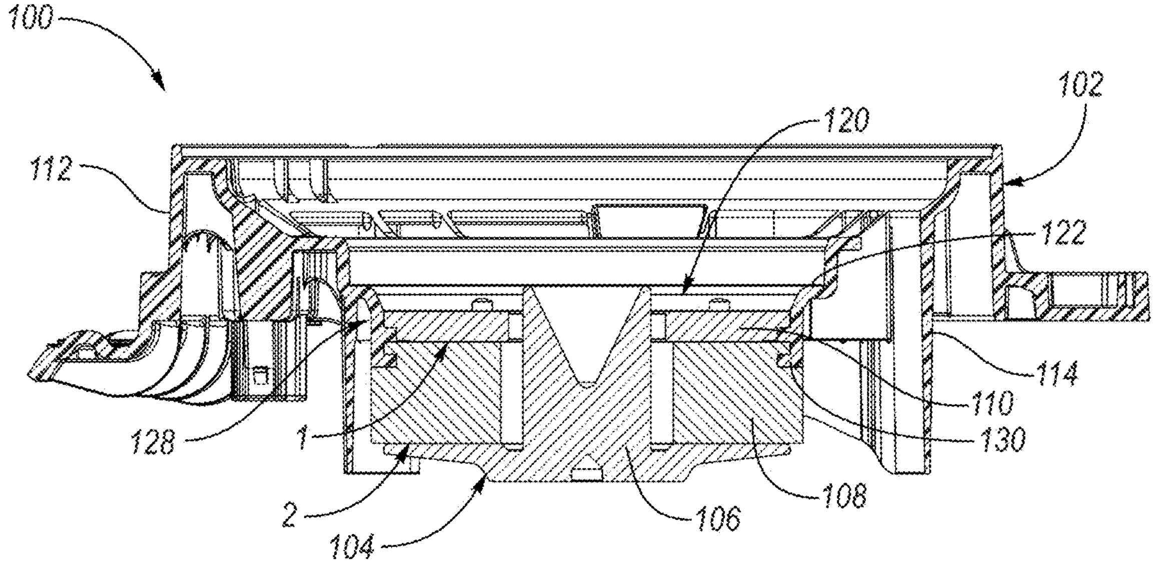
FIG. 8 is a cross-sectional view of the magnet of FIG. 7 assembled in the basket of FIG. 6.
Figure 9:
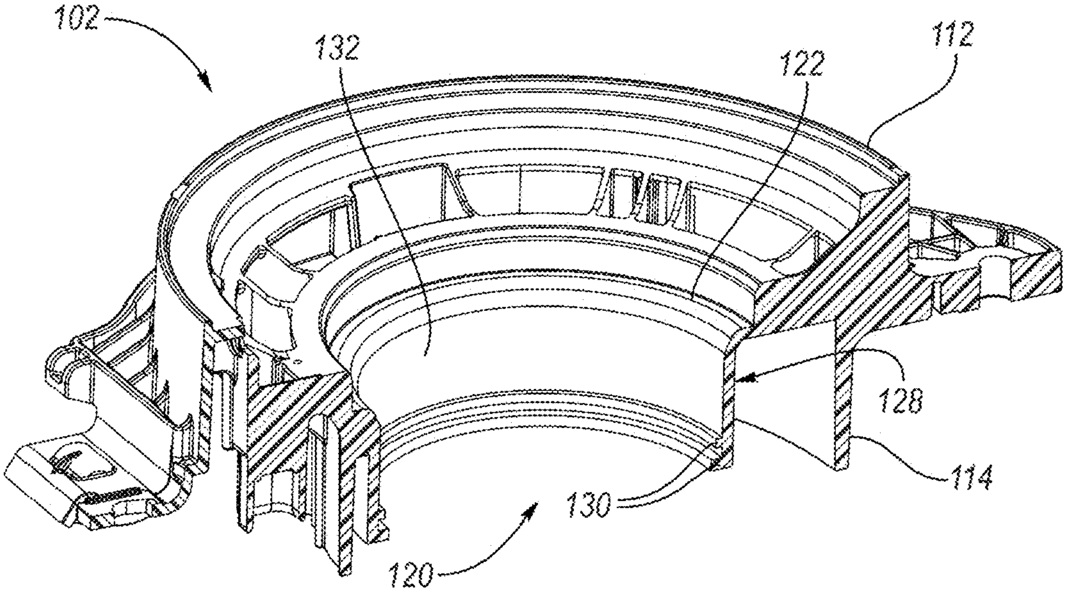
FIG. 9 is a cutaway perspective view of a basket according to a third embodiment.
Figure 10:
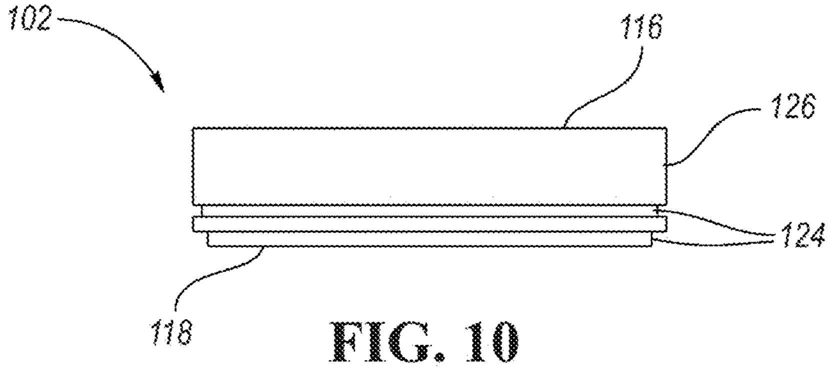
FIG. 10 is a side view of a magnet according to the third embodiment.
Figure 11:
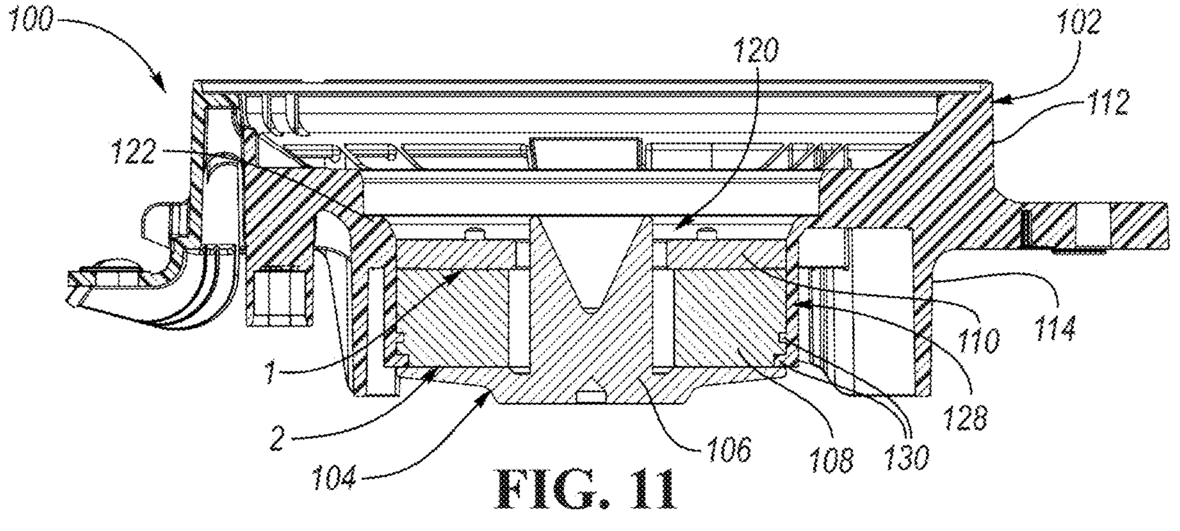
FIG. 11 is a cross-sectional view of the magnet of FIG. 10 assembled in the basket of FIG. 9.

The groove 124 may be disposed in a middle portion 134 of the magnet 108 as depicted in FIGS. 3-5, or alternatively may be adjacent to a top surface 116 of the magnet 108 as depicted in FIGS. 6-8 or adjacent to a bottom surface 118 of the magnet 108 as depicted in FIGS. 9-11. In the embodiment of FIGS. 9-11, the flange 128 may include two spaced ribs 130 and the magnet 108 may include two spaced grooves 124 which are configured to receive the two spaced ribs 130. It is understood that the number and location of grooves and ribs is merely exemplary and non-limiting, and that other configurations are also contemplated.

Figure 12:
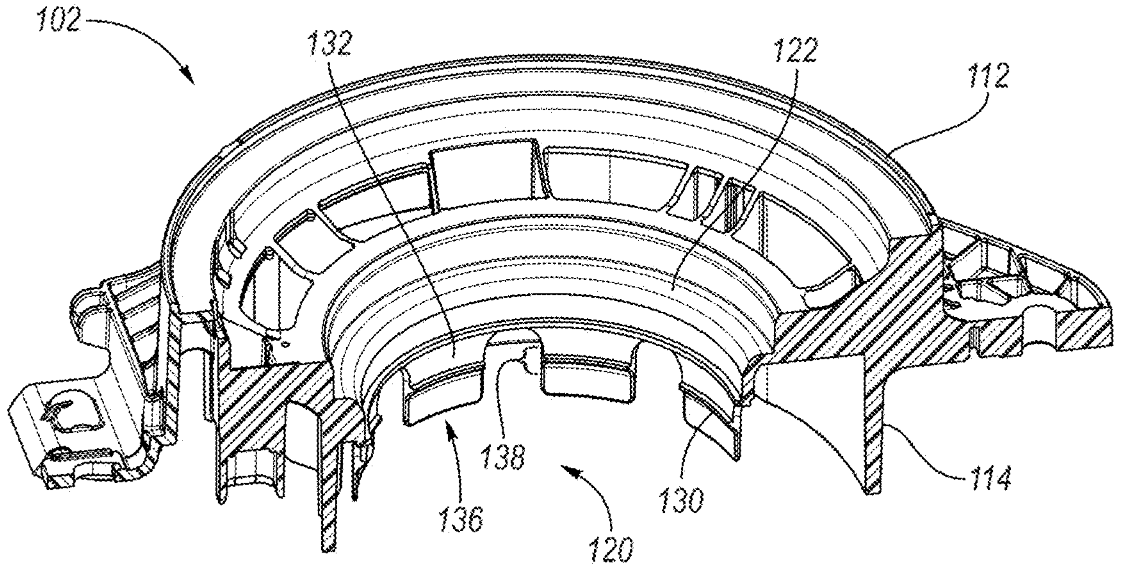
FIG. 12 is a cutaway perspective view of a basket according to a fourth embodiment.
Figure 13:
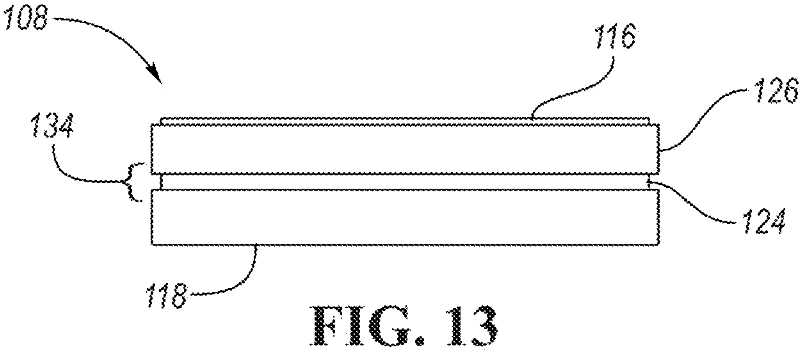
FIG. 13 is a side view of a magnet according to the fourth embodiment.
Figure 14:
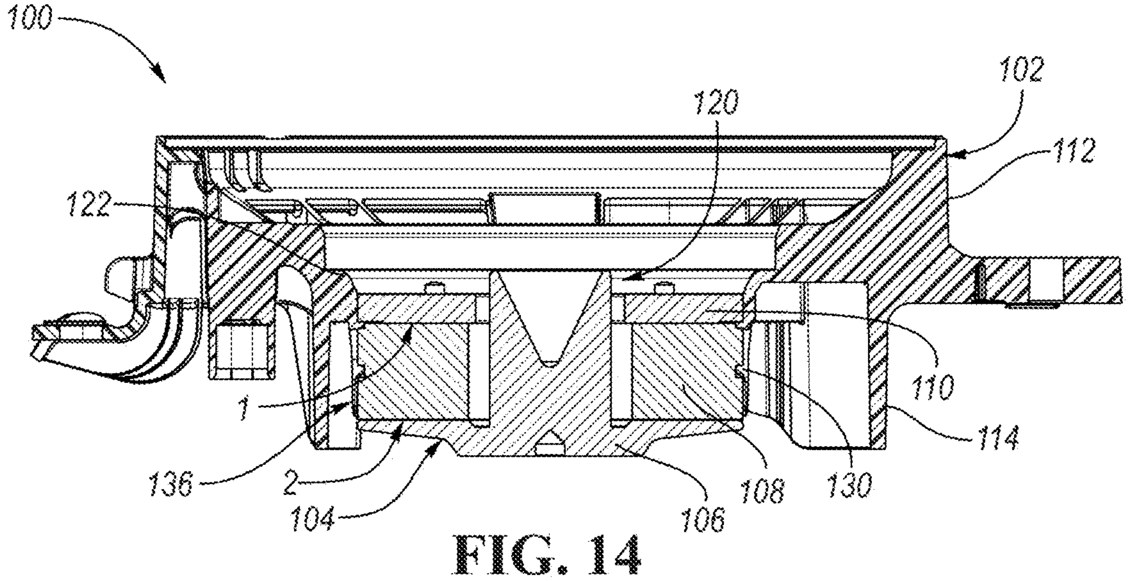
FIG. 14 is a cross-sectional view of the magnet of FIG. 13 assembled in the basket of FIG. 12.

In another embodiment depicted in FIGS. 12-14, instead of a flange 128 extending substantially or completely around the rim 122, a plurality of flexible tabs 136 may extend downwardly from the rim 122 and be spaced around the rim 122. Each tab 136 includes at least one rib 130 extending along an inner surface 132 of the tab 136, such as along a width of the tab 136. In one non-limiting example, the rib 130 may be disposed at a central portion 138 of each tab 136. The rib 130 may be created during injection molding of the plastic basket 102. The magnet 108 may be injection molded to include at least one groove 124 extending circumferentially around the magnet 108, wherein the groove 124 is a section of the magnet 108 inset from an outer surface 126 of the magnet 108.

To assemble the magnet 108 to the basket 102, the magnet 108 may be received in the opening 120 (such as from below the lower portion 114) such that the plurality of tabs 136 flex outward as the magnet 108 is inserted. Once the ribs 130 align with the groove 124, the tabs 136 flex back inward and the ribs 130 are received in the groove 124 to mechanically couple the magnet 108 to the basket 102. While four tabs 136 are illustrated in the cross-sectional view of FIG. 12, such that a total of eight tabs would be provided for the basket 102, other numbers and configurations of tabs 136 are also fully contemplated. The tabs 136 provide lateral pressure on the magnet 108 in order to securely retain the magnet 108 in the basket 102. The substantial proportion of the perimeter of the rim 122 that the tabs 136 comprise may serve to increase the strength of the coupling between the basket 102 and the magnet 108.

Although not shown with respect to the embodiments described above for FIGS. 3-14, it is contemplated that one or more ribs could alternatively be provided on the magnet 108 and one or more corresponding grooves could be formed in the flange 128 or on the spaced tabs 136. It is also understood that other embodiments may be possible through different combinations of magnet 108 and rib 130 configurations.

Figure 15:
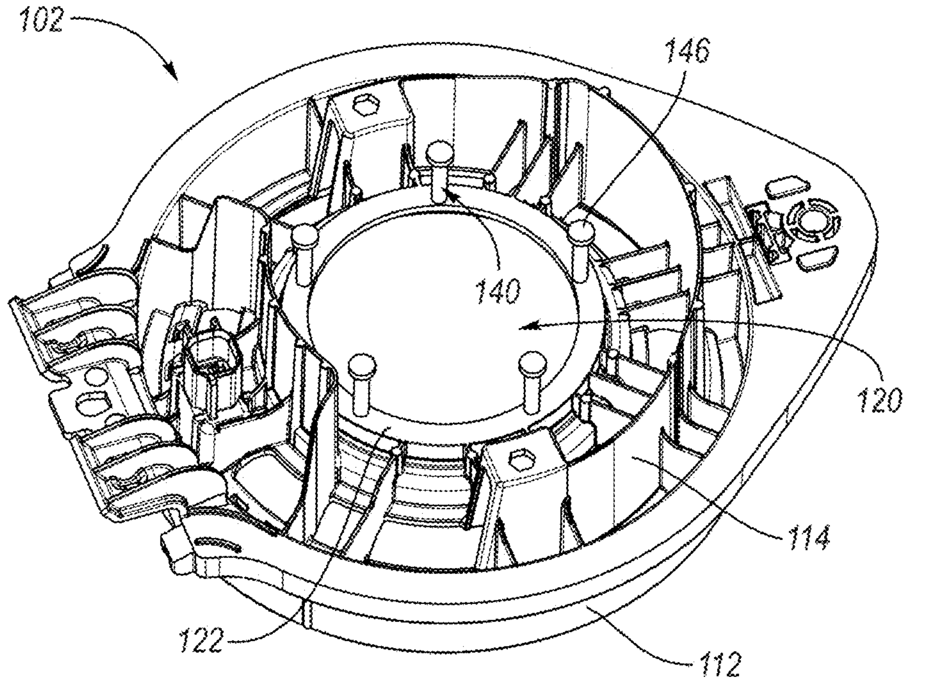
FIG. 15 is a bottom perspective view of a basket according to a fifth embodiment.
Figure 16:
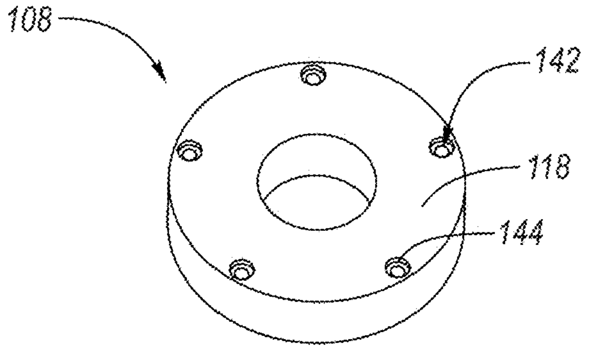
FIG. 16 is a bottom perspective view of a magnet according to the fifth embodiment.
Figure 17:
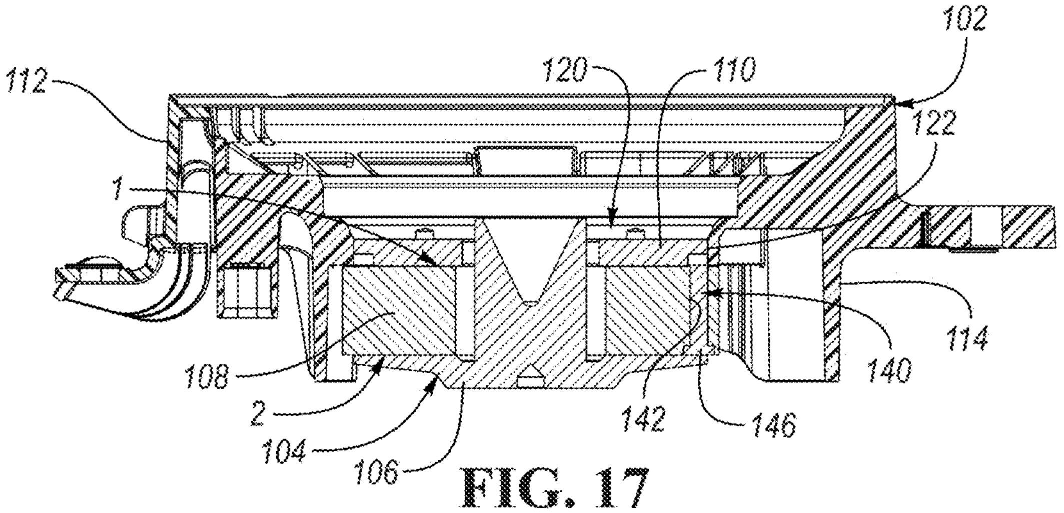
FIG. 17 is a cross-sectional view of the magnet of FIG. 16 assembled in the basket of FIG. 15.

Turning now to FIGS. 15-17, in another embodiment the rim 122 may include a plurality of posts 140 extending downwardly therefrom and spaced around the rim 122. The magnet 108 may be injection molded to include a plurality of channels 142 extending therethrough between the top surface 116 and the bottom surface 118. In one or more embodiments, each channel 142 may terminate at a recess 144 formed in the bottom surface 118 of the magnet 108. The magnet 108 is insert molded with the basket 102 below the rim 122 such that the plurality of posts 140 extend through the plurality of channels 142 to mechanically couple the magnet 108 to the basket 102. In other words, during the injection molding process, the channels 142 allow the plastic material to flow through the magnet 108 from the top surface 116 to the bottom surface 118, forming the posts 140. The recesses 144 may allow the posts 140 to form as a T-shape at a distal end 146 thereof which helps secure the ferrite magnet 108 in place with respect to the plastic basket 102. Of course, the posts 140 are not limited to this shape, and any other suitable mechanical locking configurations are also contemplated.

In the embodiment shown, the plurality of channels 142 are disposed adjacent to the outer surface 126 of the magnet 108, but are not limited to this configuration. Furthermore, while five posts 140 and five channels 142 are depicted herein, it is understood that other numbers and configurations of posts 140 and channels 142 are fully contemplated.

Advantageously, the disclosed embodiments advantageously redistribute the load of the magnet 108 and other motor components along the flange 128, tabs 136, or posts 140 to be supported by plastic interlocking with the magnet 108. The embodiments disclosed herein provide additional structural integrity to the connection between the magnet 108 and the basket 102, and alleviate the load on the first adhesive joint 1 between the front plate 110 and the top surface 116 of the magnet 108. The load due to two motor components, the magnet 108 and pole piece 106, is effectively transferred downward in the speaker assembly 100 to the mechanical coupling of the magnet 108 and the basket 102 via the flange 128, tabs 136, or posts 140. As such, the speaker assembly 100 no longer relies solely on adhesive bonding to maintain its structure and durability.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A speaker assembly, comprising:

a basket including an opening having a rim, the rim including a plurality of posts extending downwardly therefrom and spaced around the rim; and a magnet including a plurality of channels extending therethrough between a top surface and a bottom surface of the magnet, the magnet insert molded with the basket below the rim such that the plurality of posts extend through the plurality of channels to mechanically couple the magnet to the basket, wherein the magnet is in direct contact with the rim of the basket.

2. The speaker assembly of claim 1, wherein the magnet comprises ferrite and is injection molded to form the plurality of channels.

3. The speaker assembly of claim 1, further comprising a front plate disposed within the basket adjacent to the rim.

4. The speaker assembly of claim 3, wherein the top surface of the magnet is configured to be adhesively secured to the bottom surface of the front plate.

5. The speaker assembly of claim 1, further comprising a pole piece adhesively secured to the bottom surface of the magnet and extending therethrough.

6. The speaker assembly of claim 1, wherein the basket is constructed from a plastic material.

7. The speaker assembly of claim 1, wherein each of the plurality of channels terminates at a recess formed in the bottom surface of the magnet.

8. The speaker assembly of claim 7, wherein each of the plurality of posts have a distal end formed as a T-shape in the recess.

9. The speaker assembly of claim 1, wherein the plurality of channels are disposed adjacent to an outer surface of the magnet.

* * * * *